UNITED STATES PATENT OFFICE.

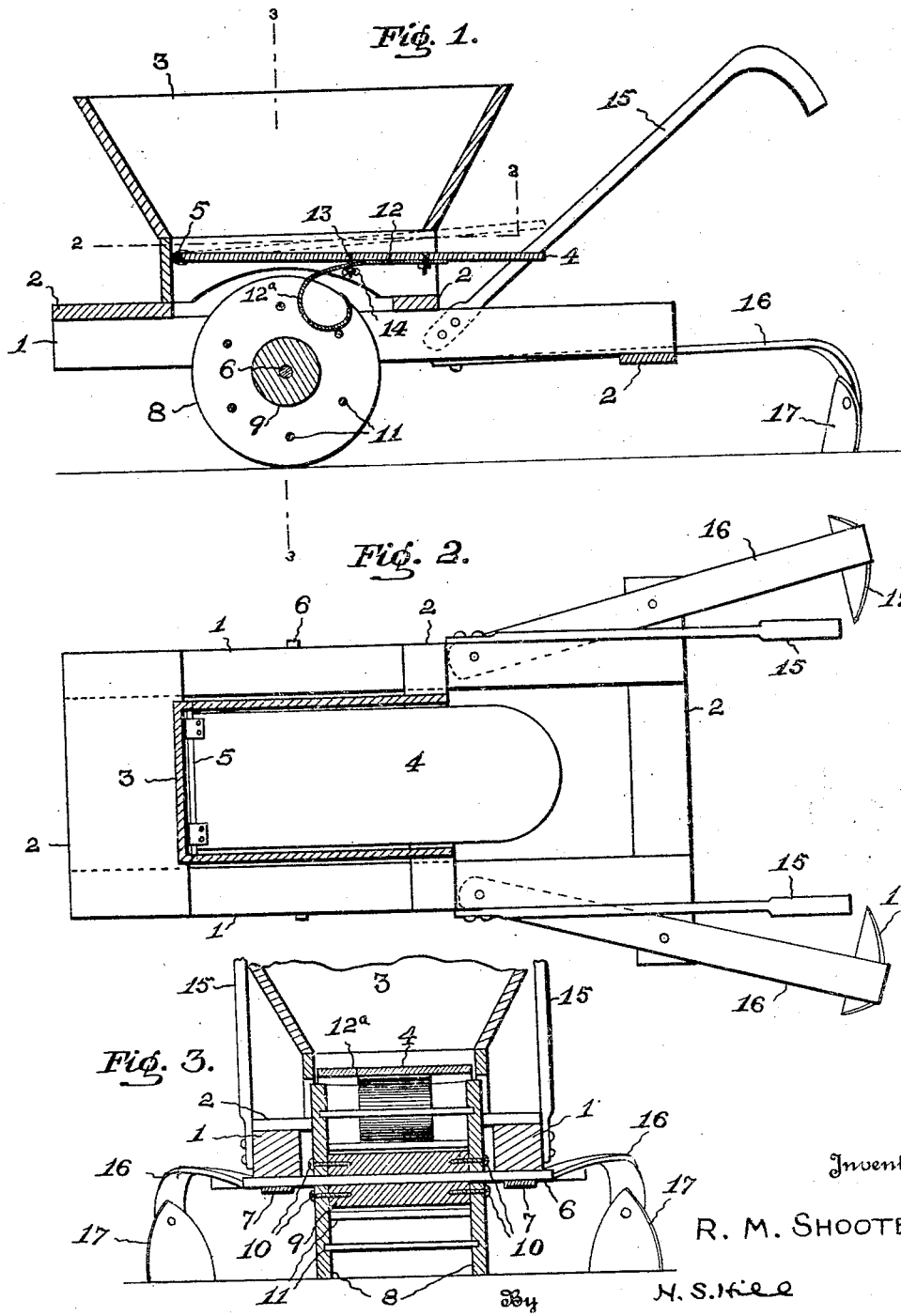

ROY MILTON SHOOTER, OF FAIRMONT, NORTH CAROLINA.

FERTILIZER-DISTRIBUTER.

1,287,473.  Specification of Letters Patent.  Patented Dec. 10, 1918.

Application filed December 27, 1917. Serial No. 209,087.

*To all whom it may concern:*

Be it known that I, ROY MILTON SHOOTER, a citizen of the United States, residing at Fairmont, in the county of Robeson, State of North Carolina, have invented a new and useful Fertilizer-Distributer; and I do hereby declare the following to be a full, clear, and exact description of the invention, such as will enable others skilled in the art to which it appertains to make and use the same.

The present invention relates to certain new and useful improvements in fertilizer distributers, and has for its object to provide a device of this character which embodies novel features of construction whereby fertilizer can be evenly and uniformly distributed over a field and which enables one man to accomplish the work for which several men are usually necessary.

Further objects of the invention are to provide a fertilizer distributer which is comparatively simple and inexpensive in its construction, which can be drawn by a single draft animal and controlled by one man, which will distribute the fertilizer in a uniform manner, and which can be adjusted to regulate the distribution of the fertilizer.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a vertical longitudinal sectional view through a fertilizer distributer constructed in accordance with the invention.

Fig. 2 is a horizontal sectional view on the line 2—2 of Fig. 1.

Fig. 3 is a transverse vertical sectional view on the line 3—3 of Fig. 1.

Corresponding and like parts are referred to in the following description and indicated in all the views of the drawings by the same reference characters.

Referring to the drawings, which illustrate one embodiment of the invention, the reference numerals 1 designate the side bars of the main frame, and 2 cross bars which connect the side bars and provide a support for the hopper 3. This hopper has an open bottom which is provided with a reciprocating bottom board 4. The forward end of the bottom board is pivotally connected to a horizontally disposed pivot rod 5 extending transversely across the bottom of the box, while the rear end of the bottom board extends rearwardly from the hopper and is movable up and down so as to be brought into and out of engagement with the lower edge of the back of the hopper, thereby agitating the contents of the hopper and causing the fertilizer to be distributed in an even and uniform manner as the machine is advanced across the field.

An axle 6 extends transversely across the main frame at a point under the hopper, the ends of the axle being journaled in bearings 7 applied to the lower faces of the side bars 1. A pair of spaced wheels 8 are mounted upon the axle 6 between the side bars 1, said wheels having a spacing sleeve 9 arranged upon the axle between the same, and being detachably secured to the ends of the spacing sleeve by suitable fastening members such as the screws 10.

The wheels 8 are connected at points spaced from the peripheries thereof by an annular series of trip rods 11, said trip rods being parallel to each other and to the axle 6, and having the extremities thereof received within recesses in the inner faces of the wheels. The trip rods are thus held securely in position when the wheels are fastened to the spacing sleeve 9 by the screws 10. A spring strip 12 is secured to the lower face of the reciprocating bottom board 4, the end of the strip which extends toward the pivot end of the bottom board being deflected downwardly and returned at 12$^a$ to provide a rounded nose adapted to successively engage the trip rods 11 of the wheels as the machine is advanced and the wheels rotated. As each trip rod 11 engages the rounded nose 12$^a$ of the spring strip 12 the swinging end of the bottom board 4 is moved upwardly into the position indicated by dotted lines on Fig. 1, subsequently dropping back to its original position when the trip rod has moved away from the rounded nose 12$^a$ of the spring strip. The bottom board is thus vibrated up and down so as to agitate the fertilizer and cause the same to be distributed in an even and uniform manner as the machine is advanced across a field. The downwardly deflected end of the spring strip 12 is provided with an opening receiving a bolt 13 having a thumb nut 14 mounted thereon. By tightening or loosening this thumb nut the end of the spring strip can be flexed to adjust the rounded end $12^a$ thereof toward or away from the bottom board, thereby enabling the amplitude of vibration of the bottom board to be varied as may be desired to obtain the best results in connection with the particular fertilizer being used. It will also be obvious that the resilient or yielding nature of the spring strip 12 will enable the parts to give a sufficient amount to prevent breakage in the event the distributer becomes clogged.

A draft animal may be hitched to the forward end of the main frame in any suitable manner for the purpose of pulling the device across a field, while the rear end of the frame is provided with conventional handle bars 15 arranged to be grasped by the operator for controlling the movements of the machine and causing it to be advanced in the proper manner. Beams 16 also diverge rearwardly from the ends of the side bars 1 and have the plow shovels 17 applied to the extremities thereof, said shovels serving to cover the fertilizer and form the ridge on which to plant.

Having thus described the invention, what I claim as new and desire to secure by Letters Patent, is:—

A fertilizer distributer including a main frame, a hopper mounted thereon and formed with an open bottom, a vibrating bottom board extending across the open bottom, a transverse axle arranged under the bottom of the hopper, a pair of spaced wheels mounted upon the axle, an annular series of trip rods connecting the spaced wheels, and a spring strip extending longitudinally of the vibrating bottom board and having one end thereof secured to the lower face of the board, the other end of the strip being deflected downwardly away from the bottom board and returned to provide a rounded nose adapted to be successively engaged by the trip rods of the supporting wheel to actuate the vibrating bottom board, and an adjusting screw engaging the downwardly deflected portion of the spring strip for flexing the same toward and away from the bottom board to adjust the position of the rounded nose of the strip and regulate the amplitude of vibration of the bottom board.

In testimony whereof I have signed my name to this specification in the presence of two subscribing witnesses.

ROY MILTON SHOOTER.

Witnesses:
L. GRADY SHOOTER,
T. B. SHOOTER.